US010539992B2

(12) United States Patent
McGraw et al.

(10) Patent No.: US 10,539,992 B2
(45) Date of Patent: Jan. 21, 2020

(54) REDUNDANT POWER EXTENDER

(71) Applicant: Hewlett Packard Enterprise Development LP, Houston, TX (US)

(72) Inventors: Montgomery C. McGraw, Magnolia, TX (US); Charles W. Cochran, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 111 days.

(21) Appl. No.: 15/549,515

(22) PCT Filed: Feb. 9, 2015

(86) PCT No.: PCT/US2015/014980
§ 371 (c)(1),
(2) Date: Aug. 8, 2017

(87) PCT Pub. No.: WO2016/130104
PCT Pub. Date: Aug. 18, 2016

(65) Prior Publication Data
US 2018/0032119 A1 Feb. 1, 2018

(51) Int. Cl.
*G06F 1/28* (2006.01)
*H02J 9/06* (2006.01)
*G06F 1/26* (2006.01)

(52) U.S. Cl.
CPC ............... *G06F 1/28* (2013.01); *H02J 9/061* (2013.01); *G06F 1/26* (2013.01)

(58) Field of Classification Search
CPC ............... G06F 1/26; G06F 1/28; H02J 9/061
See application file for complete search history.

(56) References Cited

U.S. PATENT DOCUMENTS

| 6,501,196 B1 | 12/2002 | Lo |
| 6,597,073 B1 | 7/2003 | Check |
| 8,522,077 B2 | 8/2013 | Horvath |
| (Continued) | | |

FOREIGN PATENT DOCUMENTS

| CN | 103117591 | 5/2013 |
| WO | WO-2012113808 | 8/2012 |
| (Continued) | | |

OTHER PUBLICATIONS

Govindan, S., et al., "Modeling and Analysis of Availability of Datacenter Power Infrastructure," 2010; 20 pages.

*Primary Examiner* — Terrell S Johnson
(74) *Attorney, Agent, or Firm* — Brooks, Cameron & Huebsch, PLLC

(57) ABSTRACT

In one implementation, a system for a redundant power extender includes a first automatic transfer switch comprising a number of in-ports coupled to a first power distribution unit and a second power distribution unit, wherein the first automatic transfer switch comprises an out-port coupled to a first side of a device and a second automatic transfer switch comprising a number of in-ports coupled to the first distribution unit and the second power distribution unit, wherein the second automatic transfer switch comprises an out-port coupled to a second side of the device with intelligence to allow 4+4 power redundancy from a system otherwise limited to 3+3 power redundancy.

19 Claims, 3 Drawing Sheets

(56) References Cited

U.S. PATENT DOCUMENTS

| | | | |
|---|---|---|---|
| 2001/0011845 A1* | 8/2001 | Simonelli | H02J 9/062 |
| | | | 307/66 |
| 2008/0164759 A1 | 7/2008 | Sharma et al. | |
| 2011/0245988 A1* | 10/2011 | Ingels | G06F 1/26 |
| | | | 700/295 |
| 2012/0092811 A1 | 4/2012 | Chapel | |
| 2012/0110350 A1* | 5/2012 | Horvath | G06F 1/263 |
| | | | 713/300 |
| 2016/0172900 A1* | 6/2016 | Welch, Jr. | H05K 7/1492 |
| | | | 307/64 |

FOREIGN PATENT DOCUMENTS

| | | |
|---|---|---|
| WO | WO-2014134218 | 9/2014 |
| WO | WO-2014204441 A1 | 12/2014 |

\* cited by examiner

REDUNDANT POWER EXTENDER

BACKGROUND

A plurality of data processing equipment (e.g., blade enclosures, servers, storage systems, etc.) can be utilized in a datacenter to provide computing resources for a number of purposes. Server blades are utilizing a relatively greater quantity of power with increased CPU power usage, increased memory modules, and higher power option cards. Increases in server blade performance can increase power that is required to maintain the plurality of server blades. With increases in server blade performance and power consumption it can be difficult to provide enough power for operating the plurality of server blades and also provide redundant power to the plurality of server blades when the total enclosure power consumption exceeds half the maximum capacity of all the power feeds in the enclosure.

Data processing equipment can utilize a plurality of power feeds (e.g., power supplies, etc.) that are separately coupled to a first side of the data processing equipment and a second side of the data processing equipment to provide redundant power to the data processing equipment in case one of the plurality of power feeds fails. The plurality of power feeds can be coupled to a number of power distribution units that can transfer power from a number of out-ports of the power distribution units to a number of in-ports of the data processing equipment.

The data processing equipment can utilize a 3+3 redundancy system. That is, the data processing equipment can provide power to at least three in-ports of the data processing equipment even when one of the power feeds fails. For example, a first power distribution unit can distribute power from a first power feed via a number of out-ports to a number of in-ports on a first side of the data processing equipment. In this example, the data processing equipment can utilize power from the first number of in-ports during normal operation and utilize a second number of in-ports coupled to a second power feed in case the first power feed fails or becomes non-functional. Thus, the data processing equipment can utilize a total of three in-ports even when one of the power feeds fails or becomes non-functional.

DETAILED DESCRIPTION

Figure 1:
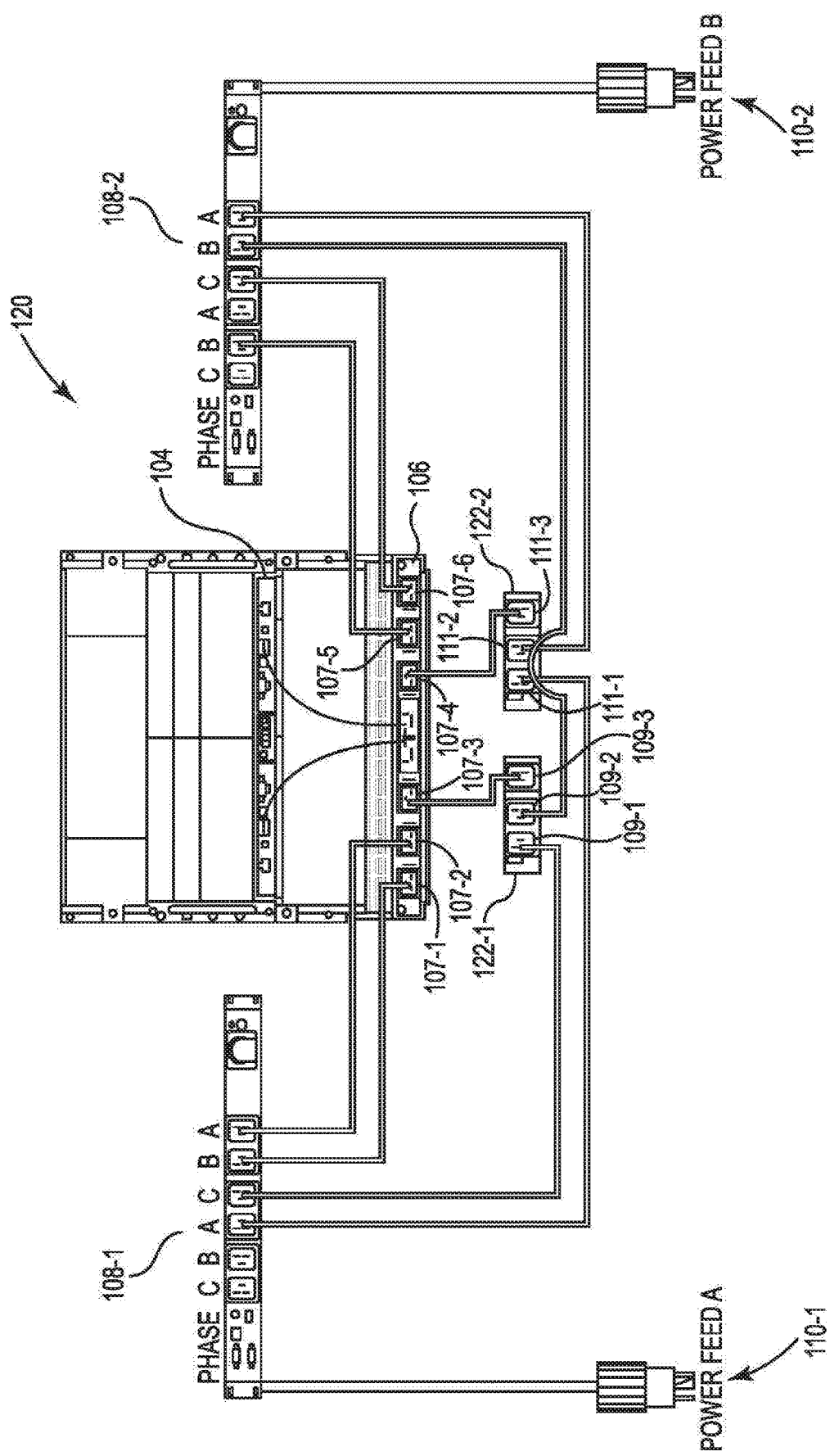
FIG. 1 illustrates a diagram of an example system for a redundant power extender consistent with the present disclosure.

A number of methods, systems, and computer readable medium for a redundant power extender are described herein. The redundant power extender systems described herein can provide a 4+4 power feed redundancy to a 3+3 power feed redundancy system with the addition of two power cables and an automatic transfer switch. The redundant power extender systems described herein can include a first automatic transfer switch comprising a number of in-ports coupled to a first power distribution unit and a second power distribution unit, wherein the first automatic transfer switch comprises an out-port coupled to a first side of a device (e.g., data processing equipment, server rack, blade enclosure, etc.) and a second automatic transfer switch comprising a number of in-ports coupled to the first distribution unit and the second power distribution unit, wherein the second automatic transfer switch comprises an out-port coupled to a second side of the device.

As used herein, an automatic transfer switch is an electrical switch that can switch a load between two power feeds (e.g., power source, power distribution unit out-port, etc.). The automatic transfer switch can switch the load between the sources when the automatic transfer switch senses that one of the two sources has lost or gained power. In some examples, there can be two power feeds that are each coupled to a designated automatic transfer switch.

The power distribution unit as used herein can be used to distribute electrical power from the power feeds to the out-ports. In some examples, the power distribution units can receive three phase power from a corresponding power feed and distributes the three phase power as single phase power to one or more in-ports of a device and/or one or more automatic transfer switches. For example, a power distribution unit can receive three phase power from a power feed. In this example, the power distribution unit can send single phase power to two in-ports of a device and single phase power to a first automatic transfer switch and to a second automatic transfer switch. In this example, the first and second automatic transfer switches can be coupled to a first side in-port of the device and a second side in-port of the device. Even though many examples herein are described with reference to three phase power, the application is not limited these examples. That is, the examples described herein can be easily applied to other forms of power (e.g., single phase, etc.) with very few alterations that would be known to those skilled in the art.

A number of previous systems can utilize an automatic transfer switch to provide additional redundancy to a computing system. For example, a first power feed and a second power feed can be coupled to redundant in-ports of the automatic transfer switch. The automatic transfer switch can include an electrical switch that can switch a load between the first power feed and the second power feed when the automatic transfer switch senses that one of the two power feeds has lost or gained power.

In the previous systems, the out-port of the automatic transfer switch can be coupled to a power distribution unit. The power distribution unit can be coupled to an in-port on a first side of the computing device and a second in-port on the right side of the computing device. Thus, the previous system can extend the power redundancy to provide a 4+4 redundancy with an addition of the automatic transfer switch and the power distribution unit. For example, when first power feed fails or becomes non-functional, the automatic transfer switch can utilize the second power feed to provide power to the distribution unit, which can provide power to both the first in-port and the second in-port of computing device.

The redundant power extender as described herein can provide 4+4 redundancy with six power feeds and two automatic transfer switches. Even though a 3+3 redundancy to an increased 4+4 redundancy is utilized as an example here, the application is not so limited to this specific example. That is, the redundant power extender as described herein, can be utilized to increase redundant power of a device without a redesign of the device hardware to add additional power feeds. The redundant power extender as described herein can increase 2+2 redundancy to 3+3 redundancy by connecting one of the power in-ports on a first side of the device and one of the power in-ports on a second side of the device to an automatic transfer switch for a total of three in-ports being supplied with single phase power from the functional power feed when one of the two power feeds fail and/or becomes non-functional. In some examples, the device with redundant power feeds can also sustain failure of a single power feed without a device "brownout" due to overloading the remaining power feeds. The redundant power extender can also be applied to a device with 1+1 hardware design power redundancy, however the device may only be protected against loss of a single power feed and would likely experience brownout due to power feed overload if one of the two power feeds failed.

FIG. 1 illustrates a diagram of an example system 120 for a redundant power extender consistent with the present disclosure. FIG. 1 can illustrate one example for extending 4+4 redundancy to a system designed for 3+3 redundancy. The system 120 can include a computing device 106 (e.g., data processing equipment, server rack, blade enclosure, server power distribution unit, etc.) with a device manager 104. As used herein, the computing device 106 can include an onboard power distribution unit that distributes power throughout the device 106. In some examples, the power distribution unit can be separated into two sides (e.g., left side, right side, etc.). In some examples, a first side (e.g., left side) of the computing device 106 can be coupled to a number of devices (e.g., power distribution unit, automatic transfer switches, etc.) that are coupled to a first power feed 110-1 and a second side (e.g., right side) of the computing device 106 can be coupled to a number of devices that are coupled to a second power feed 110-2. The redundant power extender system 120 can be utilized to increase a redundancy of the device 106 from a 3+3 redundancy to a 4+4 redundancy without having to redesign device 106 to add two more power feeds.

The system 120 can include a first power feed 110-1 and a second power feed 110-2 that are coupled to a first power distribution unit 108-1 and a second power distribution unit 108-2 respectively. The first power feed 110-1 and the second power feed 110-2 can provide three phase power to a corresponding first power distribution unit 108-1 and the second power distribution unit 108-2 respectively. In some examples, the first power feed 110-1 and the second power feed 110-2 can be provided by a separate electrical connection so that when one power feed fails the other can still be functional. As used herein, the first power distribution unit 108-1 and the second power distribution unit 108-2 can include power distribution units that can receive power from a power feed through an in-port of the power distribution unit and distribute the power through a number of out-ports (e.g., out-port A, out-port B, out-port C, etc.). The power distribution units 108-1, 108-2 can distribute the power received from the power feeds 110-1, 110-2 at a different phase (e.g., three phase in and single phase out) and/or a different power than the received power from the power feeds 110-1, 110-2.

The first power distribution unit 108-1 and the second power distribution unit 108-2 can alter the in-port power from the corresponding power feed 110-1, 110-2 to single phase power that can be distributed to the computing device 106 and/or a first automatic transfer switch 122-1 and a second automatic transfer switch 122-2. For example, the first power feed 110-1 can provide three phase power to the first power distribution unit 108-1, In this example, the first power distribution unit 108-1 can provide single phase power to in-port 107-1 and in-port 107-2 of a left side of the computing device 106. In addition, the first power distribution unit 108-1 can be coupled to an in-port 109-1 of a first automatic transfer switch 122-1 and an in-port 111-1 of a second automatic transfer switch 122-2. In addition, the second power distribution unit 108-2 can be coupled to an in-port 109-2 of a first automatic transfer switch 122-1 and an in-port 111-2 of a second automatic transfer switch 122-2. In addition, the first automatic transfer switch 122-1 can be coupled to an in-port 107-3 of a left side of the computing device 106 via out-port 109-3. Furthermore, the second automatic transfer switch 122-2 can be coupled to an in-port 107-4 of a right side of the computing device 106 via out-port 111-3.

The first power distribution unit 108-1 and the second power distribution unit 108-2 can be coupled to the first automatic transfer switch 122-1 and the second automatic transfer switch 122-2 respectively via an electrical coupler (e.g., C19/C20 coupler, etc.). In addition, the first power distribution unit 108-1 and the second power distribution unit 108-2 can be coupled to the computing device 106 via an electrical coupler (e.g., C19/C20 coupler, etc.). Furthermore, the first automatic transfer switch 122-1 and the second automatic transfer switch 122-2 can be coupled to the computing device 106 via an electrical coupler (e.g., C19/C20 coupler, etc.). In some examples, the first automatic transfer switch 122-1 and the second automatic transfer switch 122-2 can each include a built-in power distribution unit. Thus, in some examples, the first automatic transfer switch 122-1 and the second automatic transfer switch 122-2 can be connected directly to the first power feed 110-1 and the second power feed 110-2 respectively.

The system 120 can provide 4+4 redundancy with two power feeds 110-1, 110-2, two automatic transfer switches 122-1, 122-2, and two power distribution units 108-1, 108-2. The system 120 can utilize two automatic transfer switches 122-1, 122-2 and two power distribution units 108-1, 108-2 to provide power to a total of six in-ports of the computing device 106 when the first power feed 110-1 and the second power feed 110-2 are both functional. When either the first power feed 110-1 or second power feed 110-2 has failed or are non-functional, system 120 can provide power to a total of four in-ports of the device 106 for 4+4 redundancy. For example, the first power feed 110-1 can provide power to the first power distribution unit 108-1 when the second power feed 110-2 has failed or becomes non-functional. In this example, the first power distribution unit 108-1 can provide power directly to in-port 107-1 and in-port 107-2 of a left side of the computing device 106. In this example, the first power distribution unit 108-1 can provide power to the first automatic transfer switch 122-1 and the second automatic transfer switch 122-2. The first automatic transfer switch 122-1 can switch to the first power distribution unit 108-1 in-port upon detection of a failed second power distribution unit 108-2 or of a failed second power feed 110-2 and provide power to the in-port 107-3 of a left side of the computing device 106. In addition, the second automatic transfer switch 122-2 can switch to the first power distribution unit 108-1 in-port upon detection of a failed second power distribution unit 108-2 or of a failed second power feed 110-2 and provide power to the in-port 107-4 of the right side of the computing device 106, Thus, when the second power feed 110-2 has failed and/or is non-functional, the first power feed 110-1 can provide power to in-port 107-1, in-port 107-2, and in-port 107-3 on a left side of the computing device 106 as well as in-port 107-4 on a right side of the computing device 106 for a total of four powered in-ports.

In some examples, the system 120 can include a first automatic transfer switch 122-1 comprising an in-port coupled to a plurality of power distribution units 108-1, 108-2 and comprising an out-port coupled to a first side of a device 106 (e.g., first side of the server power distribution unit 106, etc.) and a second automatic transfer switch 122-2 comprising an in-port coupled to the plurality of power distribution units 108-1, 108-2 and comprising an out-port coupled to a second side of the device 106 (e.g., second side of the server power distribution unit 106, etc.). In some examples, the power distribution units 108-1, 108-2 and automatic transfer switches 122-1 and 122-2 can include instructions and/or logic to communicate to the device 106 (e.g., what power distribution unit out-port is connected to what device in-port, what automatic transfer switch in-port is connected to what power distribution out-port, and/or what automatic transfer switch out-port is connected to what device in-port, etc.).

In some examples, the first power distribution unit 108-1 and the second power distribution unit 108-2 can be coupled to the computing device 106 and/or the first automatic transfer switch 122-1 and the second automatic transfer switch 122-2 via a number of intelligent power connections. The number of intelligent power connections can be utilized to transfer power and communication signals from the first power distribution unit 108-1 and/or the second power distribution unit 108-2 to the computing device 106 and/or the automatic transfer switches 122-1, 122-2.

In some examples, information from the number of intelligent power connections can be utilized to determine a power distribution topology of the system 120. For example, the system 120 can utilize a method to determine the power distribution topology. In this example, the method can include receiving power and communication at a computing device 106 from a first power distribution unit 108-1 and a first automatic transfer switch 122-1, wherein the first automatic transfer switch 122-1 is coupled to the first power distribution unit 108-1 and a second power distribution unit 108-2, receiving power and communication at the computing device 106 from the second power distribution unit 108-2 and a second automatic transfer switch 122-2, wherein the second automatic transfer switch 122-2 is coupled to the first power distribution unit 108-1 and the second power distribution unit 108-2, and determining a complete power distribution topology for system 120 based on the communication.

In some examples, determining the power distribution topology can be determined by the device manager 104. For example, the power and communication can be received at the device manager 104 from a number of the device 106 in-ports and the device manager 104 can include instructions and/or logic to determine the power distribution topology based on the received communication. As used herein, the power distribution topology can include a topology of connections (e.g., intelligent power connections, smart connection wires, etc.) between the number of devices within the system. For example, the power distribution topology can include a topology that describes how the first power distribution unit 108-1 and the second power distribution unit 108-2 are coupled to the computing device 106 and the automatic transfer switches 122-1, 122-2.

In some examples, determining the power distribution topology can be utilized to confirm that the computing device 106 is coupled according to a predetermined power distribution topology (e.g., coupled according to system 120, etc.). For example, the power distribution topology can confirm that a 4+4 redundancy is provided by the device manager 104 when the power distribution units 108-1, 108-2 are coupled to the automatic transfer switches 122-1, 122-2 and the computing device 106. In this example, a 4+4 redundancy may not be provided when the when the power distribution units 108-1, 108-2 are coupled to the automatic transfer switches 122-1, 122-2 and the computing device 106 in a way that is not analogous to the system 120 topology.

In some examples, the intelligent power connections can be utilized to transmit communication signals from a first device to a second device within the system. For example, the intelligent power connections can be utilized send signals that can indicate what devices have provided the power. For example, power and communication received at in-port 107-3 of the left side of the computing device 106 can include communication that the power was received from an out-port of the automatic transfer switch 122-1 and an out port of either the first power distribution unit 108-1 or the second power distribution unit 108-2. Thus, the intelligent power connections can be utilized to determine the power distribution topology of the system 120.

In some examples, the system 120 can include an alteration to the device manager 104 to increase the redundant power from an original redundancy (e.g., 3+3 redundancy) to an extended redundancy (e.g., 4+4 redundancy). In some examples, the device manager 104 can automatically detect the additions of the automatic transfer switches 122-1, 122-2 and thus the extended redundancy capability. In this example, the device manager 104 can automatically alter itself to the extended redundancy, The system 120 can also be utilized to extend the redundancy for each of a plurality of power feeds. For example, power feed 110-1 and power feed 110-2 can each comprise a plurality of additional power feeds. In this example, the additional power feeds can also be coupled to corresponding automatic transfer switches that are the same or similar to automatic transfer switches 122-1, 122-2. In this example, for each additional power feed that is coupled to the corresponding automatic transfer switches in accordance with the system 120, there can be an extension of redundancy capability. For example, instead of two power feeds (e.g., power feed 110-1, power feed 110-2) the system 120 can include four power feeds (e.g., two power feeds at 110-1 and two power feeds at 110-2), then two of the four power feeds can be coupled to automatic transfer switches 122-1, 122-2 as described herein, and the other two of the four power feeds can also be coupled to different automatic transfer switches as described herein to provide 5+5 redundancy. Thus, even though system 120 describes a specific example of providing 4+4 redundancy from a 3+3 redundancy system, the system 120 can be extended to provide additional redundancy (e.g., 5+5 redundancy, 6+6 redundancy, etc.).

The system 120 can provide a 4+4 redundancy from a 3+3 redundancy without the addition of two or more power feeds. In addition, the system 120 can automatically confirm that the system 120 is coupled as described herein to provide the 4+4 redundancy. Confirming that the system 120 is coupled to provide the 4+4 redundancy can include sending a notification to a user (e.g., administrator, etc.) that the system 120 is properly coupled to provide the 4+4 redundancy. The system 120 can provide a 33 percent (e.g., increasing from a 3+3 redundancy to a 4+4 redundancy, etc.) increase in device 106 redundant power without requiring an enclosure redesign such as increasing the number of power feeds.

Figure 2:
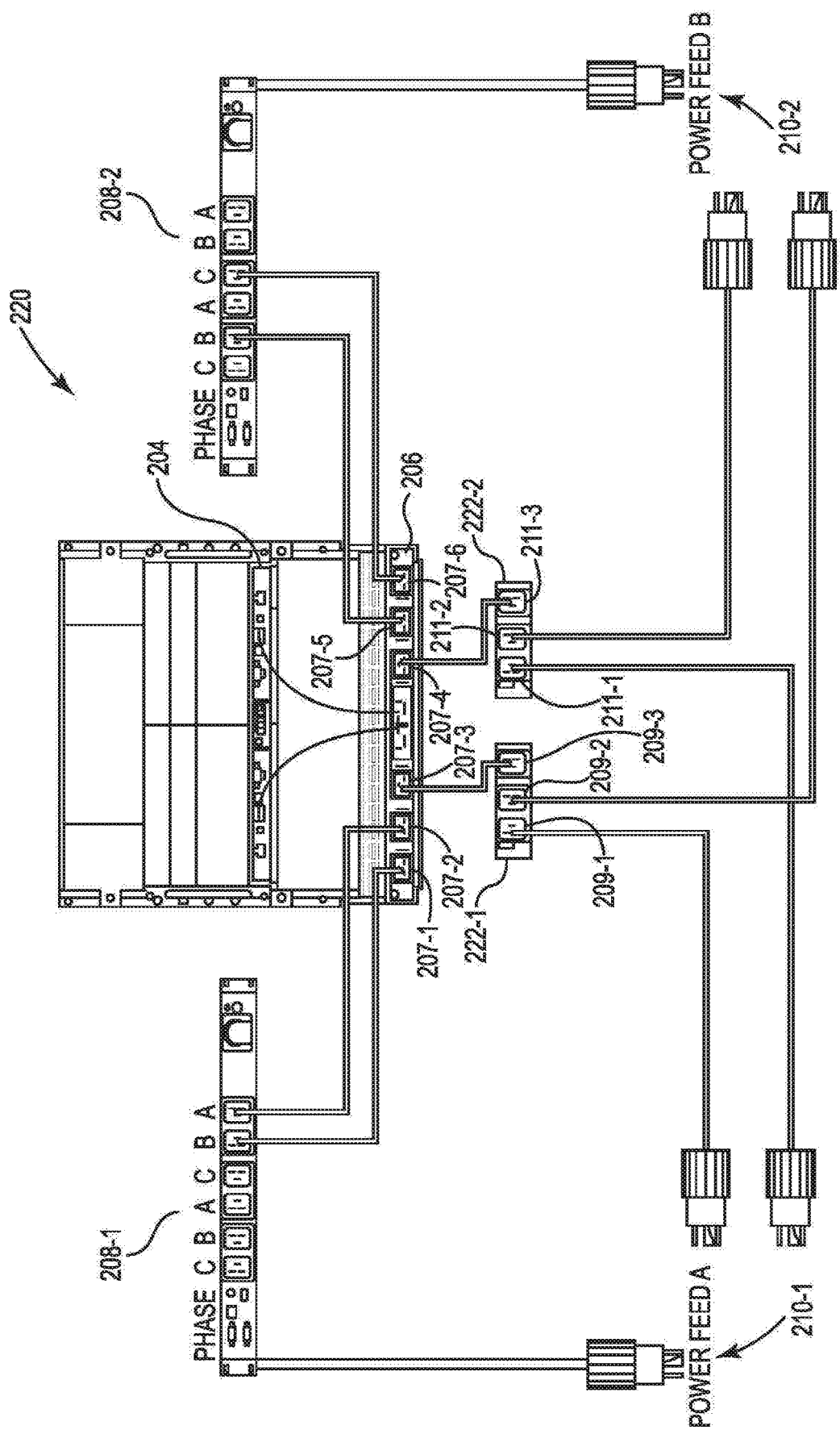
FIG. 2 illustrates a diagram of an example system for a redundant power extender consistent with the present disclosure.

FIG. 2 illustrates a diagram of an example system 220 for a redundant power extender consistent with the present disclosure. FIG. 2 can illustrate one example for extending 4+4 redundancy to a system designed for 3+3 redundancy. The system 220 can include a computing device 206 (e.g., data processing equipment, server rack, blade enclosure, server power distribution unit, etc.) with a device manager 204, As used herein, the computing device 206 can include an onboard power distribution unit that distributes power throughout the device 206. In some examples, the power distribution unit can be separated into two sides (e.g., left side, right side, etc.). In some examples, a first side (e.g., left side) of the computing device 206 can be coupled to a number of devices (e.g., power distribution unit, automatic transfer switches, etc.) that are coupled to a first power feed 210-1 and a second side (e.g., right side) of the computing device 206 can be coupled to a number of devices that are coupled to a second power feed 210-2. The redundant power extender system 220 can be utilized to increase a redundancy of the device 206 from a 3+3 redundancy to a 4+4 redundancy without having to redesign device 206 to add two more power feeds.

The system 220 can include a first power feed 210-1 and a second power feed 210-2 that are coupled to a first power distribution unit 208-1 and a second power distribution unit 208-2 respectively. The first power feed 210-1 and the second power feed 210-2 can provide three phase power to a corresponding first power distribution unit 208-1 and the second power distribution unit 208-2 respectively. In some examples, the first power feed 210-1 and the second power feed 210-2 can be provided by a separate electrical connection so that when one power feed fails the other can still be functional. As used herein, the first power distribution unit 208-1 and the second power distribution unit 208-2 can include power distribution units that can receive power from a power feed through an in-port of the power distribution unit and distribute the power through a number of out-ports (e.g., out-port A, out-port B, out-port C, etc.). The power distribution units 208-1, 208-2 can distribute the power received from the power feeds 210-1, 210-2 at a different phase (e.g., three phase in and single phase out) and/or a different power than the received power from the power feeds 210-1, 210-2.

The first power distribution unit 208-1 and the second power distribution unit 208-2 can alter the in-port power from the corresponding power feed 210-1, 210-2 to single phase power that can be distributed to the computing device 206. For example, the first power feed 210-1 can provide three phase power to the first power distribution unit 208-1. In this example, the first power distribution unit 208-1 can provide single phase power to in-port 207-1 and in-port 207-2 of a left side of the computing device 206.

The first power feed 210-1 can be coupled to in-port 209-1 of the first automatic transfer switch 222-1 and can be coupled to in-port 211-1 of the second automatic transfer switch 222-2. The second power feed 210-2 can be coupled to in-port 209-2 of the first automatic transfer switch 222-1 and can be coupled to in-port 211-2 of the second automatic transfer switch 222-2. In addition, the first automatic transfer switch 222-1 can be coupled to an in-port 207-3 of a left side of the computing device 206 via out-port 209-3. Furthermore, the second automatic transfer switch 222-2 can be coupled to an in-port 207-4 of a right side of the computing device 206 via out-port 211-3. In some examples, the first automatic transfer switch 222-1 and the second automatic transfer switch 222-2 can each include a built-in power distribution unit. Thus, in some examples, the first automatic transfer switch 222-1 and the second automatic transfer switch 222-2 can be connected directly to the first power feed 210-1 and the second power feed 210-2 respectively.

The system 220 can provide 4+4 redundancy with two power feeds 210-1, 210-2, two automatic transfer switches 222-1, 222-2, and two power distribution units 208-1, 208-2. The system 220 can utilize two automatic transfer switches 222-1, 222-2 and two power distribution units 208-1, 208-2 to provide power to a total of six in-ports of the computing device 206 when the first power feed 210-1 and the second power feed 210-2 are both functional. When either the first power feed 210-1 or second power feed 210-2 has failed or are non-functional, system 220 can provide power to a total of four in-ports of the device 206 for 4+4 redundancy. For example, the first power feed 210-1 can provide power to the first power distribution unit 208-1 when the second power feed 210-2 has failed or becomes non-functional. In this example, the first power distribution unit 208-1 can provide power directly to in-port 207-1 and in-port 207-2 of a left side of the computing device 106. In this example, the first power feed 210-1 can provide power to the first automatic transfer switch 222-1 and the second automatic transfer switch 222-2. The first automatic transfer switch 122-1 can switch to the first power feed 210-1 in-port 209-1 upon detection of a failed second power distribution unit 208-2 or of a failed second power feed 210-2 and provide power to the in-port 207-3 of a left side of the computing device 206. In addition, the second automatic transfer switch 222-2 can switch to the first power feed 210-1 in-port 211-1 upon detection of a failed second power distribution unit 208-2 or of a failed second power feed 210-2 and provide power to the in-port 207-4 of the right side of the computing device 206. Thus, when the second power feed 210-2 has failed and/or is non-functional, the first power feed 210-1 can provide power to in-port 207-1, in-port 207-2, and in-port 207-3 on a left side of the computing device 206 as well as in-port 207-4 on a right side of the computing device 206 for a total of four powered in-ports.

The system 220 can provide a 4+4 redundancy from a 3+3 redundancy without the addition of two or more power feeds. In addition, the system 220 can automatically confirm that the system 220 is coupled as described herein to provide the 4+4 redundancy. Confirming that the system 220 is coupled to provide the 4+4 redundancy can include sending a notification to a user (e.g., administrator, etc.) that the system 220 is properly coupled to provide the 4+4 redundancy. The system 220 can provide a 33 percent (e.g., increasing from a 3+3 redundancy to a 4+4 redundancy, etc.) increase in device 206 redundant power without requiring an enclosure redesign such as increasing the number of power feeds.

Figure 3:
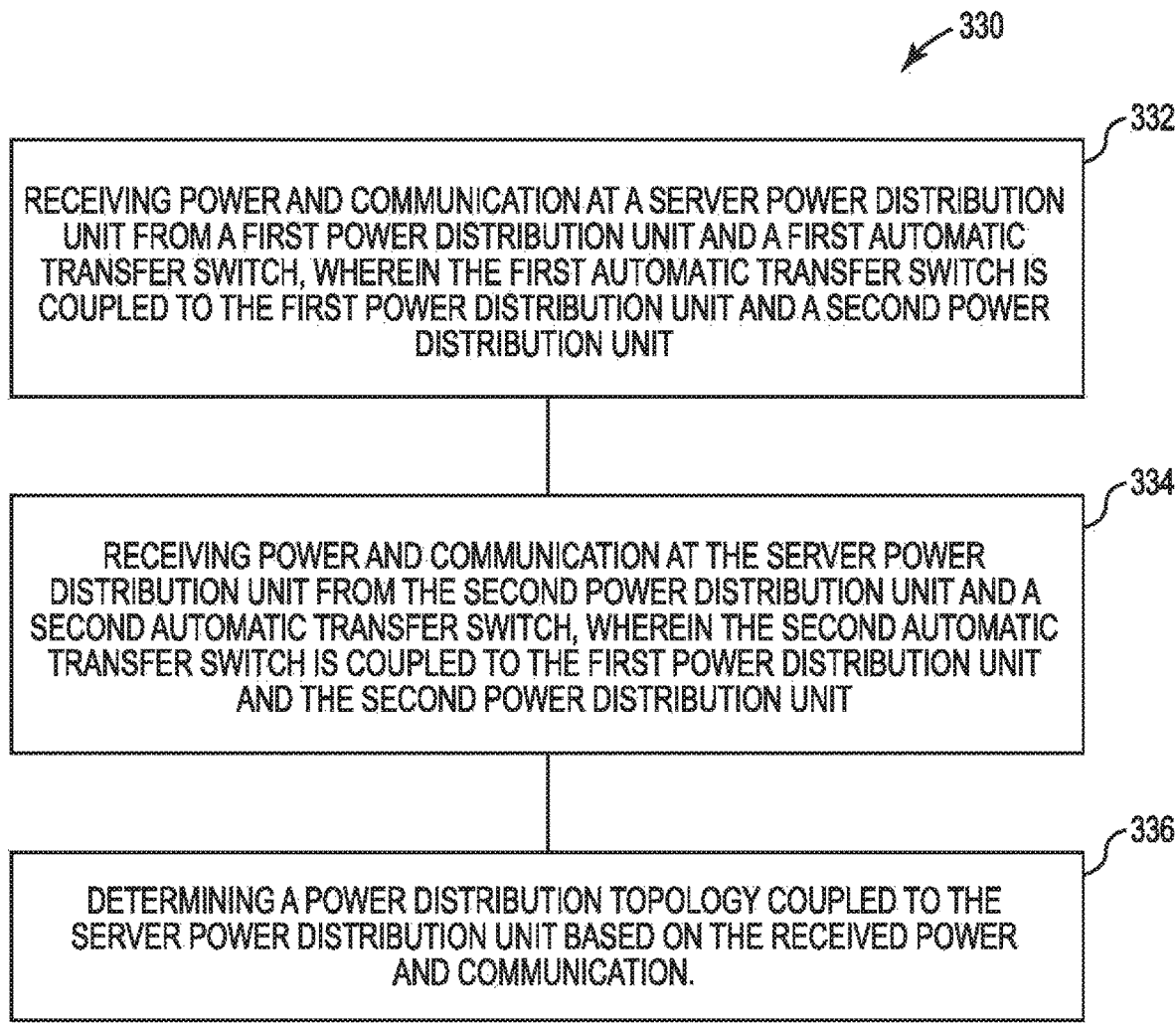
FIG. 3 is a flow chart of an example of a method for a redundant power extender consistent with the present disclosure.

FIG. 3 is a flow chart of an example of a method 330 for a redundant power extender consistent with the present disclosure. The method 330 can confirm that a topology of a computing system (e.g., system 140 as referenced in FIG. 1, etc.) is consistent with defined parameters (e.g., 4+4 redundancy). That is, the method 330 can confirm that electrical connections between a number of devices (e.g., power supplies, power feeds, power distribution units, automatic transfer switches, etc.).

At 332 the method 330 can include receiving power and communication at a server power distribution unit (e.g., computing power distribution unit, etc.) from a first power distribution unit and a first automatic transfer switch, wherein the first automatic transfer switch is coupled to the first power distribution unit and a second power distribution unit.

As described herein, the power and communication can be received at a server power distribution unit via a number of intelligent power connections from a number of system devices (e.g., power supplies, power feeds, power distribution units, automatic transfer switches, etc.). In some examples, the communication can identify a plurality of devices supplying the power, For example, the communication can identify that the power was provided by a first power feed that was received by a first power distribution unit and received by an automatic transfer switch prior to being sent to the server distribution unit.

At 334 the method 330 can include receiving power and communication at the computing power distribution unit from the second power distribution unit and a second automatic transfer switch, wherein the second automatic transfer switch is coupled to the first power distribution unit and the second power distribution unit. Receiving power and communication at the computing power distribution unit can include receiving the power and the communication via a number of intelligent power connections. As used herein, the number of intelligent power connections include electrical wires or other communication technology that can be utilized to send and receive communication signals as well as electrical power.

At 336 the method 330 can include determining a power distribution topology coupled to the server power distribution unit based on the received power and communication. Determining the power distribution topology can include confirming that the server power distribution unit is coupled according to a predetermined power distribution topology. In some examples, determining the power distribution topology can include confirming a redundancy of the power distribution topology. In some examples, determining the power distribution topology can include determining when the first power distribution unit and the second power distribution unit are coupled to the first transfer switch and the second transfer switch to provide 4+4 redundancy.

The method 330 can be utilized to determine the power distribution topology of a computing system and confirm that the devices within the computing system are coupled correctly to provide a 4+4 redundancy as described herein.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for a redundant power extender, comprising:
    a first power distribution unit comprising multiple out-ports;
    a second power distribution unit comprising multiple out-ports;
    a first automatic transfer switch comprising an in-port coupled to one of the out-ports of the first power distribution unit, an in-port coupled to one of the out-ports of the second power distribution unit, and an out-port coupled to one of a number of in-ports of a device; and
    a second automatic transfer switch comprising an in-port coupled to one of the out-ports of the first power distribution unit, an in-port coupled to one of the out-ports of the second power distribution unit, and an out-port coupled to one of the in-ports of the device;
    wherein at least one of the out-ports of the first power distribution unit and at least one of the out ports of the second power distribution unit are coupled, respectively, to ones of the in-ports of the device without passing through any automatic transfer switch.

2. The system of claim 1, wherein the first automatic transfer switch provides power from the first power distribution unit to one of the number of in-ports of the device when the second power distribution unit is unable to provide power.

3. The system of claim 1, wherein the first power distribution unit and the second power distribution unit each receive three phase power.

4. The system of claim 3, wherein the at least four power out-ports comprise single phase outlets.

5. The system of claim 1, wherein the first power distribution unit and the second power distribution unit are communicatively coupled, via a number of intelligent power connections, to: the device, the first automatic transfer switch, and the second automatic transfer switch.

6. The system of claim 5, wherein the first power distribution unit provides information, via the number of intelligent power connections, to the device relating to a power distribution topology of the device.

7. The system of claim 6, wherein the second power distribution unit provides information, via the number of intelligent power connections, to the device relating to a power distribution topology of the device.

8. The method of claim 7, further comprising a device manager, wherein the information is received at the device manager and the device manager provides instructions and/or logic to determine the power distribution topology based on the received information.

9. The method of claim 8, wherein the power distribution topology comprises information on the coupling between the device, the first power distribution unit, the second power distribution unit, the first automatic transfer switch, and the second automatic transfer switch.

10. The system of claim 1, wherein two of at least four power out-ports of the second power distribution unit are coupled to two in-ports of the device, by-passing the first and second automatic transfer switches; one of the at least four power out-ports is coupled to the first automatic transfer switch; and one of the at least four power out-ports is coupled to the second automatic transfer switch.

11. The system of claim 1, wherein a first in-port of the device and a second in-port of the device are portions of a server power distribution unit.

12. A system for a redundant power extender, comprising:
    a first automatic transfer switch comprising a number of in-ports coupled to a first power feed and a second power feed and comprising an out-port coupled to a first in-port of a device;
    a second automatic transfer switch comprising a number of in-ports coupled to the first power feed and the second power feed and comprising an out-port coupled to a second in-port of the device;
    a first power distribution unit; and
    a second power distribution unit;

wherein the first power distribution unit and the second power distribution unit each comprise at least two out-ports; and wherein the at least two out-ports of the first power distribution unit are coupled to a third in-port and a fourth in-port of the device, bypassing the first and second automatic transfer switches.

13. The system of claim 12, wherein the first automatic transfer switch is commutatively coupled to the units first power distribution unit and the second power distribution unit and the device via a number of intelligent power connections.

14. The system of claim 12, wherein the first power distribution unit comprises logic to test the system.

15. The system of claim 12, wherein the first, second, third, and fourth in-ports of the device are portions of a server power distribution unit.

16. A method for a redundant power extender, comprising:
receiving power and communication at a server power distribution unit from a first out-port of a first power distribution unit and a first automatic transfer switch, wherein the first automatic transfer switch is coupled to the first power distribution unit and a second power distribution unit;
receiving power and communications at the server power distribution unit from a second out-port of the first power distribution unit;
receiving power and communication at the server power distribution unit from a first out-port of the second power distribution unit and a second automatic transfer switch, wherein the second automatic transfer switch is coupled to the first power distribution unit and the second power distribution unit;
receiving power and communications at the server power distribution unit from a second out-port of the second power distribution unit;
wherein the second out-port of the first and second power distribution units are coupled to the server power distribution unit by bypassing the first automatic transfer switch and the second automatic transfer switch; and
determining a power distribution topology coupled to the server power distribution unit based on the received power and communication.

17. The method of claim 16, wherein determining the power distribution topology includes confirming that the server power distribution unit is coupled according to a predetermined power distribution topology.

18. The method of claim 16, wherein determining the power distribution topology includes confirming a redundancy of the power distribution topology.

19. The method of claim 16, wherein determining the power distribution topology includes determining when the first power distribution unit and the second power distribution unit are coupled to the first transfer switch and the second transfer switch to provide 4+4 redundancy.

* * * * *